United States Patent
Suzuki

(10) Patent No.: US 10,864,903 B2
(45) Date of Patent: Dec. 15, 2020

(54) VEHICLE CONTROLLER

(71) Applicant: TOYOTA JIDOSHA KABUSHIKI KAISHA, Toyota (JP)

(72) Inventor: Takeaki Suzuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

(21) Appl. No.: 16/145,480

(22) Filed: Sep. 28, 2018

(65) Prior Publication Data

US 2019/0152466 A1   May 23, 2019

(30) Foreign Application Priority Data

Nov. 22, 2017   (JP) .................................. 2017-224816

(51) Int. Cl.
*B60W 20/10* (2016.01)
*B60K 6/28* (2007.10)

(52) U.S. Cl.
CPC ............... *B60W 20/10* (2013.01); *B60K 6/28* (2013.01); *B60W 2510/244* (2013.01); *B60W 2520/10* (2013.01); *B60Y 2200/92* (2013.01); *B60Y 2300/192* (2013.01)

(58) Field of Classification Search
None
See application file for complete search history.

(56) References Cited

U.S. PATENT DOCUMENTS

2015/0008731 A1*  1/2015  Takahashi ............... B60R 16/03
                                                          307/9.1
2015/0377162 A1   12/2015  Kamioka et al.

FOREIGN PATENT DOCUMENTS

| EP | 2 878 793 A2 | 6/2015 |
| JP | 2004-293327 A | 10/2004 |
| JP | 2005-291158 A | 10/2005 |
| JP | 2015-101299 A | 6/2015 |
| JP | 5971668 B2 | 8/2016 |

* cited by examiner

*Primary Examiner* — Tamara L Weber
(74) *Attorney, Agent, or Firm* — Oliff PLC

(57) ABSTRACT

A vehicle controller for use with a vehicle is configured to control the vehicle. The vehicle includes an internal combustion engine, an electric generator, an auxiliary machine, an electricity storage device, and a DC-DC converter. The controller is configured to execute an automatic stop process of stopping combustion control of the internal combustion engine in response to an automatic stop request of the internal combustion engine, and an increase process of operating, when the automatic stop process is executed, the DC-DC converter to increase an amount of electricity supplied to the electricity storage device, thereby increasing an electricity generation amount of the electric generator.

6 Claims, 5 Drawing Sheets

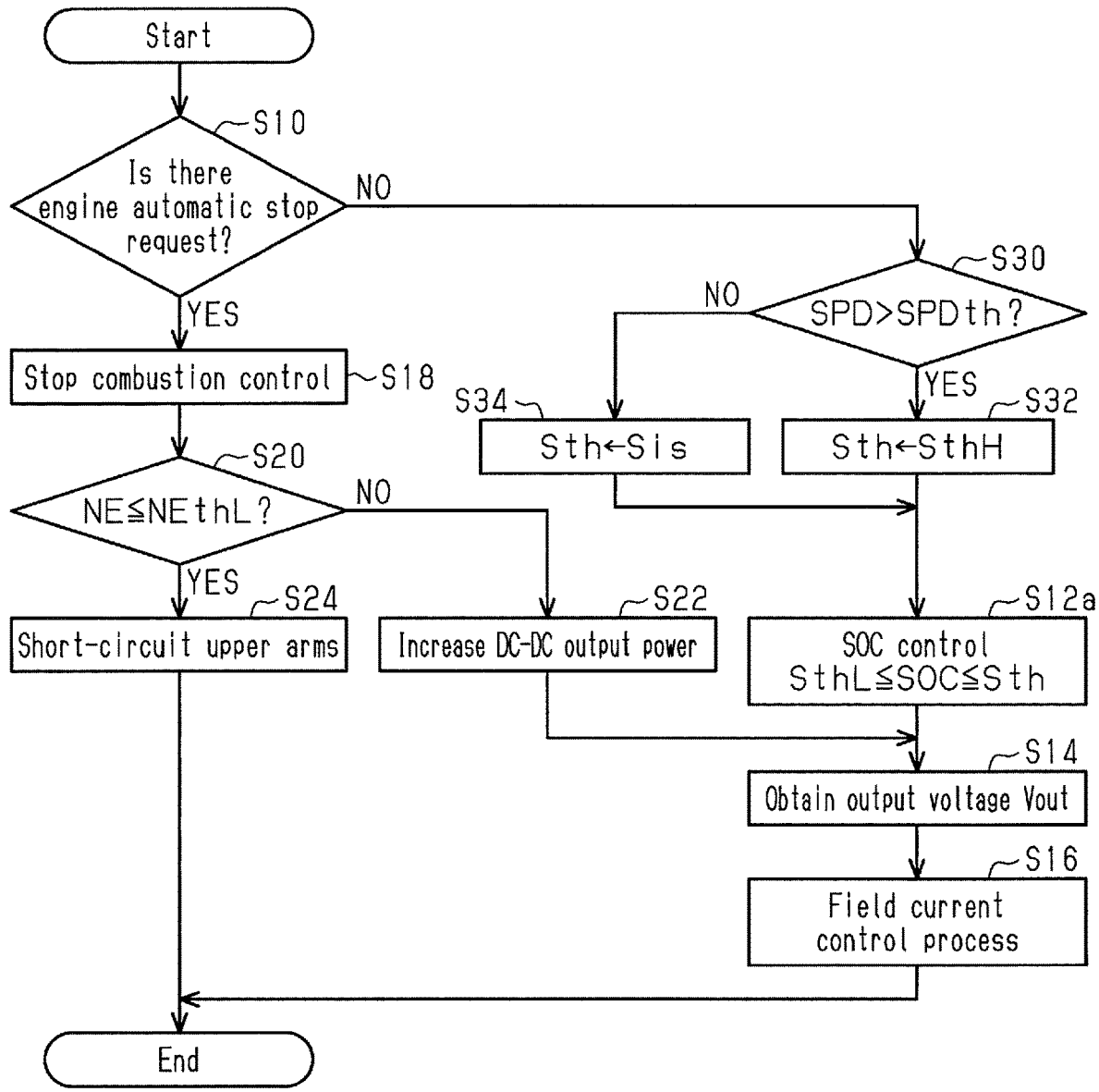

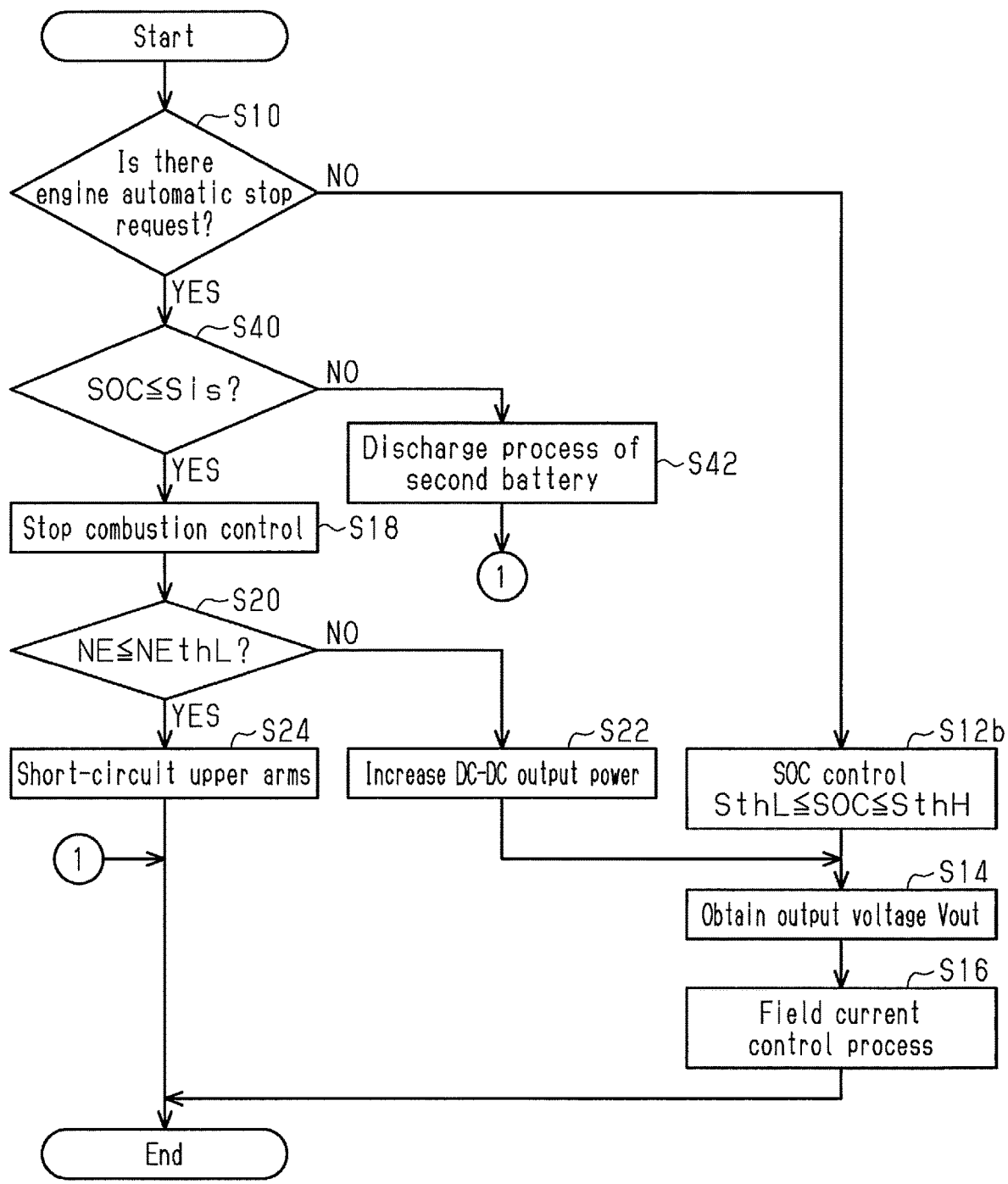

VEHICLE CONTROLLER

CROSS REFERENCE TO RELATED APPLICATION

This application claims priority from Japanese Patent Application No. 2017-224816, filed on Nov. 22, 2017, the disclosure of which is incorporated herein by reference in its entirety.

BACKGROUND ART

The present invention relates to a vehicle controller employed in a vehicle that includes an internal combustion engine, an electric generator, which converts rotational force of the crankshaft of the internal combustion engine into electricity, an auxiliary machine, to which the output voltage of the electric generator is applied, an electricity storage device, a DC-DC converter, which is connected between the electricity storage device and the set of the electric generator and the auxiliary machine.

For example, Japanese Laid-Open Patent Publication No. 2015-101299 discloses a system that includes an alternator (electric generator), which is connected to the crankshaft of an internal combustion engine via a belt. The output voltage of the electric generator is applied to a battery and auxiliary machines. In addition, this system is equipped with a controller that raises the output voltage of the electric generator to a higher level than usual when executing so-called idle reduction process, which is an automatic stop process of stopping the combustion control of the internal combustion engine. This is a control aiming at shortening the time until rotation of the crankshaft stops by increasing the load torque applied to the crankshaft by the electric generator.

When the output voltage of the electric generator is made higher than usual, the voltage applied to the auxiliary machines also becomes higher than usual. This may cause the operating states of the auxiliary machines to deviate from intended states.

SUMMARY

Example 1

A vehicle controller for use with a vehicle is provided. The controller is configured to control the vehicle. The vehicle includes an internal combustion engine, an electric generator, which converts rotational force of a crankshaft of the internal combustion engine into electricity, an auxiliary machine, to which an output voltage of the electric generator is applied, an electricity storage device, and a DC-DC converter, which is connected between the electricity storage device and a set of the electric generator and the auxiliary machine. The controller is configured to execute: an automatic stop process of stopping combustion control of the internal combustion engine in response to an automatic stop request of the internal combustion engine; and an increase process of operating, when the automatic stop process is executed, the DC-DC converter to increase an amount of electricity supplied toward the electricity storage device, thereby increasing an electricity generation amount of the electric generator.

In the above-described configuration, when the automatic stop process is executed, the DC-DC converter is operated through the increase process to increase the electricity supplied to the electricity storage device. The increase process does not necessarily need to increase the voltage in a portion between the DC-DC converter and the electric generator. This increases the electricity generation amount of the electric generator while limiting the increase in the voltage applied to the auxiliary machine, and, in turn, increases the load torque applied to the crankshaft.

Example 2

In the vehicle controller of Example 1, the electricity storage device is a rechargeable battery. The controller is configured to execute, on condition that the increase process is not being executed, a state-of-charge limiting process of operating the DC-DC converter such that a state of charge of the rechargeable battery becomes lower than or equal to a specified value. The increase process includes a process of allowing the state of charge to exceed the specified value.

In the above-described configuration, on condition that the increase process is not being executed, the DC-DC converter is operated such that the state of charge of the rechargeable battery becomes lower than or equal to the specified value through the state-of-charge limiting process. Therefore, setting the specified value to a value smaller than the allowable upper limit allows the increase process to be executed while preventing the increase process from increasing the actual state of charge up to a state of charge unfavorable for the rechargeable battery.

Example 3

In the vehicle controller of Example 1, the electricity storage device is a rechargeable battery. The controller is configured to: execute the automatic stop process on condition that a state of charge of the rechargeable battery is lower than or equal to a specified value; and execute a discharge process of discharging the electricity storage device if the state of charge is higher than the specified value when an automatic stop request of the internal combustion engine is made.

In the above-described configuration, in a case in which the state of charge is greater than the specified value when an automatic stop request is made, the electricity storage device is discharged through the discharges process without executing the automatic stop process. Therefore, setting the specified value to a value smaller than the allowable upper limit allows the increase process to be executed while preventing the increase process from increasing the actual state of charge up to a state of charge unfavorable for the rechargeable battery.

Example 4

In the vehicle controller of Example 2 or 3, the controller is configured to: execute the automatic stop process on condition that a vehicle speed is lower than or equal to a specified speed: and when the vehicle speed is lower than or equal to a predetermined speed, execute, on condition that the increase process is not being executed, a state-of-charge limiting process of operating the DC-DC converter such that a state of charge of the rechargeable battery becomes lower than or equal to a specified value. The predetermined speed is set to be lower than or equal to the specified speed.

In the above-described configuration, on condition that the increase process is not being executed, the DC-DC converter is operated such that the state of charge of the rechargeable battery becomes lower than or equal to the specified value through the state-of-charge limiting process. Therefore, setting the specified value to a value smaller than the allowable upper limit allows the increase process to be executed while preventing the increase process from increasing the actual state of charge up to a state of charge unfavorable for the rechargeable battery. In addition, in the above-described configuration, since the state-of-charge limiting process is not executed in a high vehicle speed at which the automatic stop process is not executed, the state of charge of the rechargeable battery can be increased as much as possible.

Example 5

In the vehicle controller of any one of Examples 1 to 4, after the increase process is started, the controller maintains the output voltage of the electric generator to be lower than or equal to the output voltage of the electric generator prior to the start of the increase process.

In the above-described configuration, when the increase process is executed, the output voltage of the electric generator is maintained to be lower than or equal to the output voltage prior to the start of the increase process. Thus, the voltage applied to the auxiliary machine does not rise due to the increase process.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings:

FIG. 4 is a flowchart showing the procedure of processes executed by a vehicle controller according to a second embodiment; and FIG. 5 is a flowchart showing the procedure of processes executed by a vehicle controller according to a third embodiment.

DETAILED DESCRIPTION

First Embodiment

A vehicle controller according to a first embodiment will now be described with reference to the drawings.

Figure 1:
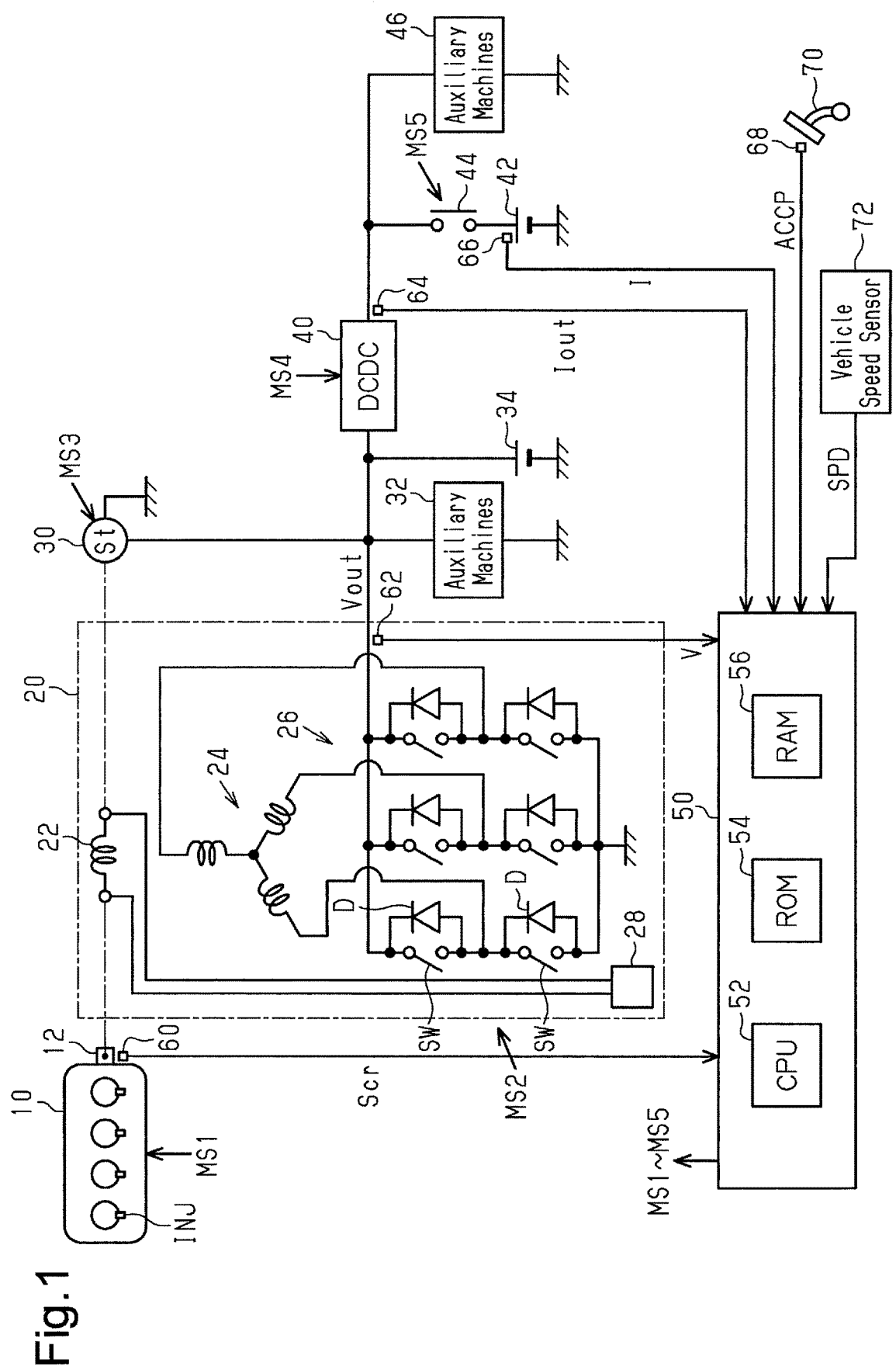
FIG. 1 is a diagram showing a controller according to a first embodiment and part of a vehicle drive system.

An internal combustion engine 10 shown in FIG. 1 is configured such that a resonance frequency band is included in a rotational speed region in which the rotational speed of a crankshaft 12 is lower than the target speed of the idle speed control. The resonance frequency band is not necessarily defined by the internal combustion engine 10 alone, but may be determined by the structure and arrangement of the drive system including the internal combustion engine 10. An electric generator 20 is connected to the crankshaft 12. The electric generator 20 includes a field winding 22 on the rotor, which is rotated by the rotational force of the crankshaft 12, a three-phase armature winding 24 on the stator side, a full-wave rectifier circuit 26, which is connected to the terminal of each phase of the armature winding 24, and a regulator circuit 28, which regulates the current flowing through the field winding 22. The full-wave rectifier circuit 26 has the same configuration as a three-phase inverter. The full-wave rectifier circuit 26 includes switching elements SW of upper arms, switching elements SW of lower arms, and diodes D. Each diode D is connected in antiparallel with the corresponding switching elements SW. The diodes D alone may constitute a full-wave rectifier circuit.

Further, the crankshaft 12 is also connected to a starter motor 30, which gives initial rotation to the crankshaft 12. An output voltage Vout of the electric generator 20 is applied not only to the starter motor 30, but also to auxiliary machines 32 such as headlights and wipers and a first battery 34. The present embodiment assumes a configuration in which the operating voltage of some of the auxiliary machines 32 (for example, the headlights and wipers) is determined by the output voltage Vout of the electric generator 20 so that no voltage regulator is provided to step down the output voltage Vout to a predetermined value. The first battery 34 is, for example, a lead-acid battery having a terminal voltage of about 12 V. The output voltage Vout is also applied to a DC-DC converter 40. The terminal of the DC-DC converter 40 that is on the side opposite to the electric generator 20 is connected to a second battery 42 via a relay 44 and auxiliary machines 46. The DC-DC converter 40 is connected between the second battery 42 and the set of the electric generator 20 and the auxiliary machines 32. The DC-DC converter 40 is a power converter circuit capable of bidirectionally transmitting electricity. That is, the DC-DC converter 40 is capable of both transmitting electricity from the side corresponding to the first battery 34 to the side corresponding to the second battery 42 and transmitting electricity from the side corresponding to the second battery 42 to the side corresponding to the first battery 34. The second battery 42 is, for example, a lithium-ion rechargeable battery having a terminal voltage of about 12 V. On the other hand, the auxiliary machines 46 include a shift-by-wire actuator and a radar device used to measure the distance from a vehicle in front.

The internal combustion engine 10 is controlled by a vehicle controller 50, which operates the operated portions of the engine 10 such as fuel injection valves INJ, the electric generator 20, the starter motor 30, and the DC-DC converter 40, thereby controlling controlled amounts (torque, rotational speed, and the like). At this time, the vehicle controller 50 refers to an output signal Scr of a crank angle sensor 60, the output voltage Vout of the electric generator 20 detected by a voltage sensor 62, an output current Iout of the DC-DC converter 40 detected by a current sensor 64, and a charge-discharge current I of the second battery 42 detected by a current sensor 66. Further, the vehicle controller 50 refers to the depression amount of an accelerator pedal 70 (accelerator operation amount ACCP) detected by an accelerator sensor 68 and a vehicle speed SPD detected by a vehicle speed sensor 72. The vehicle controller 50 includes a CPU 52, a ROM 54, and a RAM 56 and uses the CPU 52 to execute control of the above-described controlled amounts by executing programs stored in the ROM 54.

Figure 2:
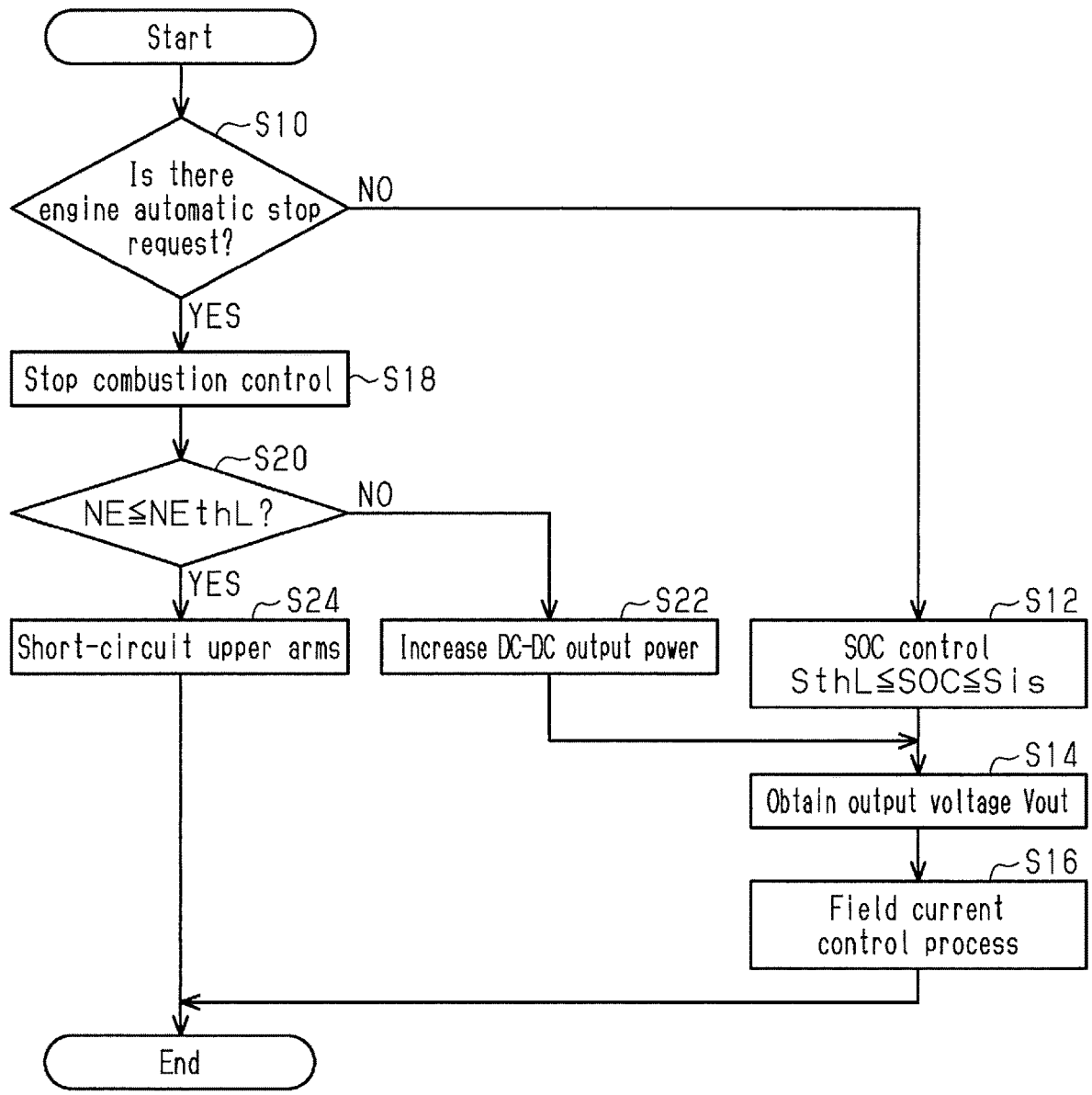
FIG. 2 is a flowchart showing the procedure of processes executed by a vehicle controller according to the embodiment.

FIG. 2 shows one of the processes executed by the vehicle controller 50. The process shown in FIG. 2 is implemented by the CPU 52 repeatedly executing programs stored in the ROM 54 at a predetermined interval. In the following description, the number of each step is represented by the letter S followed by a numeral.

In the series of processes shown in FIG. 2, the CPU 52 first determines whether there is an automatic stop request of the internal combustion engine 10 (S10). The CPU 52 determines that there is an automatic stop request on condition that the logical conjunction is true of the condition that the accelerator pedal 70 is released and the condition that the vehicle speed SPD is lower than or equal to a specified speed SPDth. When determining that no automatic stop request has been made (S10: NO), the CPU 52 outputs an operation signal MS4 to the DC-DC converter 40 so as to operate the DC-DC converter 40 such that the state of charge SOC of the second battery 42 is higher than or equal to the lower limit SthL of a permissible range and lower than or equal to a specified value Sis (S12). That is, the CPU 52 operates the DC-DC converter 40 such that the closer to the lower limit SthL the state of charge SOC, the greater becomes the electricity output by the DC-DC converter 40 from the side corresponding to the first battery 34 to the side corresponding to the second battery 42. The specified value Sis is smaller than the upper limit SthH of the permissible range of the state of charge SOC of the second battery 42. The state of charge SOC simply needs to be calculated, for example, by integration of the charge-discharge current I by the CPU 52. The state of charge SOC of the second battery 42 is the ratio of the actual charge amount to the full charge amount of the second battery 42.

Next, the CPU 52 obtains the output voltage Vout (S14). Then, based on the output voltage Vout, the CPU 52 operates the regulator circuit 28 to control a field current, which is the current flowing in the field winding 22, thereby controlling the output voltage Vout to a target voltage. In the present embodiment, the electricity generation control by the electric generator 20 is implemented by turning off all the switching elements SW. When the load of the auxiliary machines 32 is great, the CPU 52 may set the target voltage to a higher value.

In contrast, when determining that an automatic stop request has been made (S10: YES), the CPU 52 stops injection of fuel from the fuel injection valves INJ to stop combustion control of the air-fuel mixture in the combustion chambers of the internal combustion engine 10, thereby executing an automatic stop process (S18). Next, the CPU 52 determines whether a rotational speed NE is lower than or equal to a predetermined speed NEthL (S20). The predetermined speed NEthL is set to the upper limit of the range in which the temperature of the switching elements SW does not rise excessively to cause deterioration until the rotational speed NE of the crankshaft 12 becomes zero even after the process of S24, which will be discussed below, is started. When determining that the rotational speed NE is higher than the predetermined speed NEthL (S20: NO), the CPU 52 increases the output of the DC-DC converter 40 if the output of the DC-DC converter 40 when electricity is transmitted from the side corresponding to the first battery 34 to the side corresponding to the second battery 42 is deemed to be positive (S22). Specifically, the CPU 52 performs feedback control to set the output current Iout to the side corresponding to the second battery 42 by the DC-DC converter 40 to the target current, and increases the target current in the process of S22. Then, the CPU 52 proceeds to the process of S14. In the case of executing the process of S16 at the time of the process of S22, the CPU 52 does not increase the target voltage due to the increase in the output of the DC-DC converter 40.

Further, when determining that the rotational speed NE is lower than or equal to the predetermined speed NEthL (S20: YES), the CPU 52 turns on all the switching elements SW of the upper arms of the full-wave rectifier circuit 26 and turns off all the switching elements SW of the lower arms (S24). This is a process of short-circuiting the terminals of the armature winding 24 by the switching elements SW and converting the rotational force of the crankshaft 12 into thermal energy through heat generation by the switching elements SW. This process causes a current from the switching elements SW of the upper arms to flow to one or two phases of the armature winding 24, and a current flows from the remaining phase to the switching elements of the upper arms.

When the processes of steps S16, S24 are completed, the CPU 52 temporarily ends the series of processes shown in FIG. 2.

The operation and advantages of the present embodiment will now be described.

Figure 3:
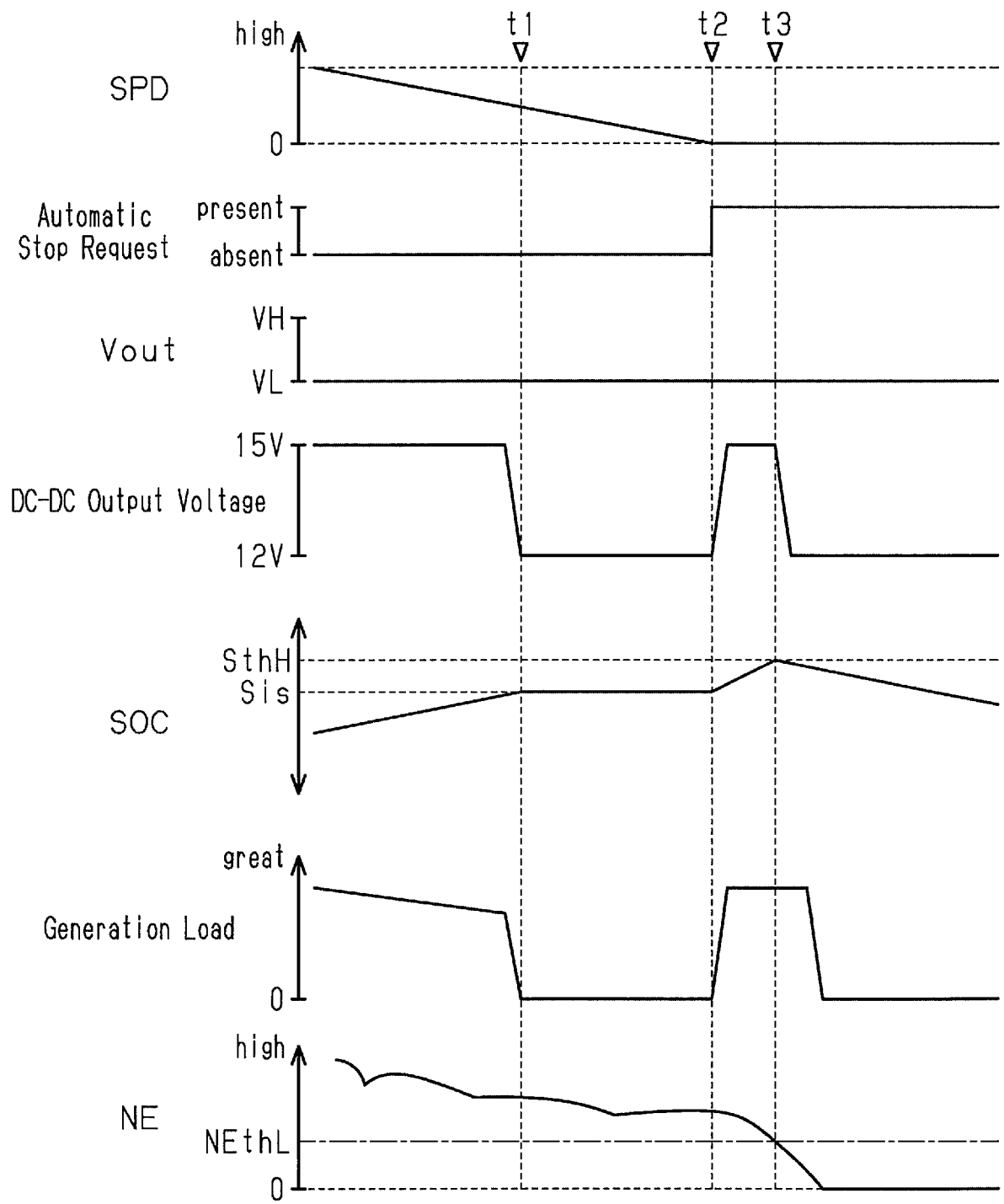
FIG. 3 is a timing diagram showing an advantage of the embodiment.

FIG. 3 shows changes in the vehicle speed SPD, the presence or absence of the automatic stop request, the output voltage Vout of the electric generator 20, the voltage applied by the DC-DC converter 40 to the second battery 42 (DC-DC output voltage), the state of charge SOC of the second battery 42, the electricity generation load (torque) of the electric generator 20, and the rotational speed NE.

In the example shown in FIG. 3, at a point in time t1, when the SOC reaches the specified value Sis, the CPU 52 sets the output of the DC-DC converter 40 to the side corresponding to the second battery 42 to zero so as to control the state of charge SOC to be lower than or equal to the specified value Sis. In the present embodiment, the second battery 42 is assumed to have a terminal voltage of 12 V. Thus, in FIG. 3, when the voltage applied to the second battery 42 by the DC-DC converter 40 is 12 V, the output of the electricity by the DC-DC converter 40 from the side corresponding to the battery 34 to the side corresponding to the second battery 42 is stopped. Thereafter, when there is an automatic stop request at a point in time t2, the CPU 52 increases the output of electricity by the DC-DC converter 40 from the side corresponding to the first battery 34 to the side corresponding to the second battery 42. In FIG. 3, the voltage applied to the second battery 42 by the DC-DC converter 40 is 15 V, which is higher than the terminal voltage of the second battery 42. Thus, the output of the electricity by the DC-DC converter 40 from the side corresponding to the first battery 34 to the side corresponding to the second battery 42 increases. Although this increases the state of charge SOC of the second battery 42, the state of charge SOC will not exceed the upper limit SthH since the state of charge SOC was limited to be lower than or equal to the specified value Sis before the point in time t2.

Thereafter, when the rotational speed NE drops to the predetermined speed NEthL at a point in time t3, the CPU 52 stops the output of electricity by the DC-DC converter 40 from the side corresponding to the first battery 34 to the side corresponding to the second battery 42. Then, the CPU 52 turns on all the switching elements SW of the upper arms, so that the rotational force of the crankshaft 12 is reduced by the heat generation of the switching elements SW.

As described above, in the present embodiment, when an automatic stop request is made, it is possible to increase the electricity generation amount of the electric generator 20 without increasing the output voltage Vout by increasing the output of the DC-DC converter 40. Increasing the electricity generation amount of the electric generator 20 increases the load torque of the crankshaft 12 and, in turn, rapidly reduces the rotational force of the crankshaft 12. Therefore, when the rotational speed of the crankshaft 12 decreases through the automatic stop process, the rotational frequency of the crankshaft 12 quickly passes the above-mentioned resonance frequency band.

Since it is unnecessary to increase the output voltage Vout when increasing the electricity generation amount, it is possible to limit the increase in the voltage applied to the auxiliary machines 32 due to the automatic stop process. The auxiliary machines 32 include ones that directly use the output voltage Vout of the electric generator 20 without using the voltage regulated by a regulator as the operating voltage. For such auxiliary machines, it is possible to prevent the occurrence of a situation in which the operation is deviated from what is assumed by an increase in the drive voltage during the automatic stop process.

The present embodiment described above further has the following advantages.

(1) When the automatic stop process is not being executed, the DC-DC converter 40 is operated such that the state of charge SOC of the second battery 42 is lower than or equal to the specified value Sis. Thus, even if the execution of the automatic stop process increases the electricity output by the DC-DC converter 40 from the side corresponding to the first battery 34 to the side corresponding to the second battery 42, the state of charge SOC of the second battery 42 is prevented from exceeding the upper limit SthH.

Second Embodiment

A second embodiment will now be described with reference to the drawings. The differences from the first embodiment will mainly be discussed.

FIG. 4 shows one of the processes executed by the vehicle controller 50 of the present embodiment. The processes shown in FIG. 4 are executed by the CPU 52 repeatedly executing programs stored in the ROM 54 at a predetermined interval. In FIG. 4, the same step numbers are given to the processes that correspond to those in FIG. 2.

In the series of processes shown in FIG. 4, when determining that there is no automatic stop request (S10: NO), the CPU 52 determines whether the vehicle speed SPD is higher than the specified speed SPDth (S30). This is a process of predicting whether an automatic stop request will be made in the near future. When determining that the vehicle speed SPD is higher than the specified speed SPDth (S30: YES), the CPU 52 determines that the automatic stop process will not be executed in the near future and substitutes the upper limit SthH for the threshold value Sth (S32). In contrast, when determining that the vehicle speed SPD is lower than or equal to the specified speed SPDth (S30: NO), the CPU 52 determines that the automatic stop process will be executed in the near future and substitutes the specified value Sis for the threshold value Sth.

When the processes of S32 and S34 are completed, the CPU 52 operates the DC-DC converter 40 such that the state of charge SOC of the second battery 42 is controlled to be in higher than or equal to the lower limit SthL and lower than or equal to the threshold value Sth (S12a). Upon completion of the process of S12a, the CPU 52 proceeds to the process of S14.

The operation and advantages of the present embodiment will now be described.

When the vehicle speed SPD is higher than the specified speed SPDth, the CPU 52 limits the state of charge SOC of the second battery 42 to be lower than or equal the upper limit SthH. This allows the amount of charge of the second battery 42 to be increased. Thus, as compared to the case of limiting the state of charge SOC to the specified value Sis, it is possible to increase the electricity generation amount of the electric generator 20 when the electricity generation amount can be increased without increasing the fuel consumption amount as in the regenerative control. This improves the energy consumption rate. Moreover, when the vehicle speed SPD is lower than or equal to the specified speed SPDth, the state of charge SOC of the second battery 42 is limited to be lower than or equal to the specified value Sis. In this case, the automatic stop process is executed. This prevents the state of charge SOC of the second battery 42 from exceeding the upper limit SthH when the electricity output by the DC-DC converter 40 from the side corresponding to the first battery 34 to the side corresponding to the second battery 42 is increased.

Third Embodiment

A third embodiment will now be described with reference to the drawings. The differences from the first embodiment will mainly be discussed.

FIG. 5 shows one of the processes executed by the vehicle controller 50 of the present embodiment. The processes shown in FIG. 5 are executed by the CPU 52 repeatedly executing programs stored in the ROM 54 at a predetermined interval. In FIG. 5, the same step numbers are given to the processes that correspond to those in FIG. 2.

In the series of processes shown in FIG. 5, when determining that no automatic stop request has been made (S10: NO), the CPU 52 controls the state of charge SOC of the second battery 42 such that the state of charge SOC is higher than or equal to the lower limit SthL and lower than or equal to the upper limit SthH (S12b), and proceeds to the process of S14. In contrast, when determining that an automatic stop request has been made (S10: YES), the CPU 52 determines whether the state of charge SOC of the second battery 42 is lower than or equal to the specified value Sis (S40). This is a process of determining whether the automatic stop process can be executed. When determining that the state of charge SOC is lower than or equal to the specified value Sis (S40: YES), the CPU 52 stops the combustion control and executes the automatic stop process (S18). In contrast, when determining that the state of charge SOC is higher than the specified value Sis (S40: NO), the CPU 52 operates the DC-DC converter 40 to output electricity from the side corresponding to the second battery 42 to the side corresponding to the first battery 34, thereby executing the discharge process of the second battery 42 (S42). The discharge process refers to a process in which the DC-DC converter 40 is caused to output lower electricity to the side corresponding to the first battery 34 than the electricity output to the side corresponding to the second battery 42, so that the increase in the voltage applied to the auxiliary machines 32 is suppressed. After executing the process of S42, the CPU 52 temporarily ends the series of processes shown in FIG. 5.

The operation and advantages of the present embodiment will now be described.

If the state of charge SOC of the second battery 42 is higher than the specified value Sis when an automatic stop request is made, the CPU 52 executes the discharge process of the second battery 42. When the state of charge SOC is lower than or equal to the specified value Sis, the CPU 52 executes the automatic stop process to increase the amount of electricity output by the DC-DC converter 40 from the side corresponding to the first battery 34 to the side corresponding to the second battery 42. Thus, through the process of increasing the amount of electricity output by the DC-DC converter 40 to the side corresponding to the second battery 42, the state of charge SOC of the second battery 42 is prevented from exceeding the upper limit SthH.

<Correspondence>

The correspondence between the items in the above-described embodiments and the items described in the above SUMMARY is as follows. Below, the correspondence is shown for each of the numbers in the examples described in the above SUMMARY.

Example 1

The auxiliary machine to which the output voltage of the electric generator is applied corresponds to the auxiliary machines 32, and the electricity storage device corresponds to the second battery 42. The automatic stop process corresponds to the process of S18, and the increase process corresponds to the process of S22.

Example 2

The state-of-charge limiting process corresponds to the process of S12 in FIG. 2 and the process of S12a subsequent to the process of S34 in FIG. 4.

Example 3 corresponds to the process of FIG. 5.

Example 4 corresponds to the process of S30.

Example 5 corresponds to the output voltage Vout of the electric generator 20 in FIG. 3 being fixed to the voltage VL. That is, as shown in FIG. 3, after the increase process is started, the vehicle controller 50 maintains the output voltage Vout of the electric generator 20 to be lower than or equal to the output voltage Vout of the electric generator 20 prior to the start of the increase process.

Other Embodiments

The above-described embodiments may be modified as follows. The above-described embodiments and the following modifications can be combined as long as the combined modifications remain technically consistent with each other.

Regarding State-of-Charge Limiting Process

In FIG. 4, when the vehicle speed SPD is lower than or equal to the specified speed SPDth, the maximum value of the state of charge SOC is limited to the specified value Sis, but the configuration is not limited to this. For example, when the vehicle speed SPD is lower than or equal to a predetermined speed that is higher than the specified speed SPDth, the maximum value of the state of charge SOC may be limited to the specified value Sis.

Regarding Electricity Storage Device

The second battery 42 is not limited to a lithium-ion rechargeable battery, but may be a nickel metal-hydride battery, for example. The second battery 42 may be replaced by a capacitor.

Regarding Setting of Predetermined Speed NEthL

In the above-described embodiments, the predetermined speed NEthL is set to the upper limit of the range in which the temperature of the switching elements SW does not rise excessively to cause deterioration, but the configuration is not limited to this. For example, the predetermined speed NEthLt may be set to the upper limit of the range of the rotational speed NE in which electricity generation by the electric generator 20 is not possible.

Regarding Process when Potation Speed NE is Less than or Equal to Specified Speed NEthL In the above-described embodiments, the terminals of the armature winding 24 are short-circuited by turning on all the switching elements SW of the upper arms and turning off all the switching elements SW of the lower arms. However, the configuration is not limited to this. For example, the short circuit may be achieved by turning off all the switching elements SW of the upper arms and turning on all the switching elements SW of the lower arms. As discussed in the section "Regarding Electric generator" below, the short circuit process can be executed even if the electric generator 20 does not have the switching elements SW.

If the rotational speed NE is lower than or equal to the predetermined speed NEthL and no resonance frequency is included in the rotational frequency band up to the predetermined speed NEthL, the process for short-circuit does not necessarily need to be performed.

Regarding Electric Generator

The electric generator is not limited to one having the same configuration as the three-phase inverter as the full-wave rectifier circuit 26, but may be configured without the switching elements SW. However, even in this case, in order to execute the process corresponding to the process of S20, a configuration is preferable in which the terminals of the armature winding 24 can be connected to each other (short-circuited) without a battery or the like in between.

Regarding Discharge Process

In the above-described embodiments, the process of discharging the second battery 42 using the DC-DC converter 40 is described as the discharge process, but the configuration is not limited to this. For example, when the auxiliary machines 46 include an electric motor, the electricity consumption may be increased by supplying a reactive current to the electric motor without increasing the torque of the electric motor.

For example, the processes of S40 and S42 may be added to the processes of FIG. 4. In this case, the process of S42 is executed if a positive determination is made in the process of S10 when the process of S12a is yet to be able to control the state of charge SOC to be lower than or equal to the threshold value Sth.

Regarding Resonance Frequency Band

In the above-described embodiments, it is assumed that the resonance frequency band is in a region lower than the rotational frequency during the idle speed control, but this configuration is not indispensable. In other words, the aim of increasing the load torque applied to the crankshaft 12 by the electric generator 20 during the automatic stop process is not limited to the rotational frequency of the crankshaft 12 quickly passing through the above-mentioned resonance frequency band.

Regarding DC-DC Converter

For example, in the first embodiment and the second embodiment described above, a DC-DC converter may be employed that can output electricity from the side corresponding to the first battery 34 to the side corresponding to the second battery 42 and cannot output electricity from the side corresponding to the second battery 42 to the side corresponding to the first battery 34.

Regarding Electricity Generation Control

In the above-described embodiment, the electricity generation control is executed with all the switching elements SW turned off, but the configuration is not limited to this. For example, the switching elements SW to which a diode D through which current flows is connected in reverse parallel connection may be turned on.

Regarding Vehicle Controller

The vehicle controller is not limited to a device that includes the CPU 52 and the ROM 54 and executes software processing. For example, at least part of the processes executed by the software in the above-described embodiment may be executed by hardware circuits dedicated to execution of these processes (such as ASIC). That is, the vehicle controller may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Therefore, the present examples and embodiments are to be considered as illustrative and not restrictive and the disclosure is not to be limited to the examples and embodiments given herein.

The invention claimed is:

1. A vehicle controller for use with a vehicle that includes an internal combustion engine, an electric generator, which converts rotational force of a crankshaft of the internal combustion engine into electricity, an auxiliary machine, to which an output voltage of the electric generator is applied, a rechargeable battery, and a DC-DC converter, which is connected between the rechargeable battery and a set of the electric generator and the auxiliary machine, the controller being configured to control the vehicle by executing:

an automatic stop process of stopping combustion control of the internal combustion engine in response to an automatic stop request of the internal combustion engine, and an increase process of increasing, when the automatic stop process is executed, an output voltage of the DC-DC converter toward the rechargeable battery with an output voltage of the electric generator to the auxiliary machine and the DC-DC converter maintained, thereby increasing an electricity generation amount of the electric generator.

2. The vehicle controller according to claim 1, wherein the controller is configured to execute, on condition that the increase process is not being executed, a state-of-charge limiting process of operating the DC-DC converter such that a state of charge of the rechargeable battery becomes lower than or equal to a specified value, and the increase process includes a process of allowing the state of charge to exceed the specified value.

3. The vehicle controller according to claim 2, wherein the controller is configured to execute the automatic stop process on condition that a vehicle speed is lower than or equal to a specified speed, and when the vehicle speed is lower than or equal to a predetermined speed, execute, on condition that the increase process is not being executed, a state-of-charge limiting process of operating the DC-DC converter such that a state of charge of the rechargeable battery becomes lower than or equal to a specified value, and the predetermined speed is set to be lower than or equal to the specified speed.

4. The vehicle controller according to claim 1, wherein the controller is configured to execute the automatic stop process on condition that a state of charge of the rechargeable battery is lower than or equal to a specified value, and execute a discharge process of discharging the rechargeable battery if the state of charge is higher than the specified value when an automatic stop request of the internal combustion engine is made.

5. The vehicle controller according to claim 1, wherein, after the increase process is started, the controller maintains the output voltage of the electric generator to be equal to the output voltage of the electric generator prior to the start of the increase process.

6. The vehicle controller according to claim 1, wherein the controller executes the automatic stop process and the increase process to shorten a time until rotation of the crankshaft stops when a vehicle speed reaches to zero.

\* \* \* \* \*